J. BLONG.
TRACTION WHEEL.
APPLICATION FILED MAY 28, 1912.
1,057,405.
Patented Apr. 1, 1913.
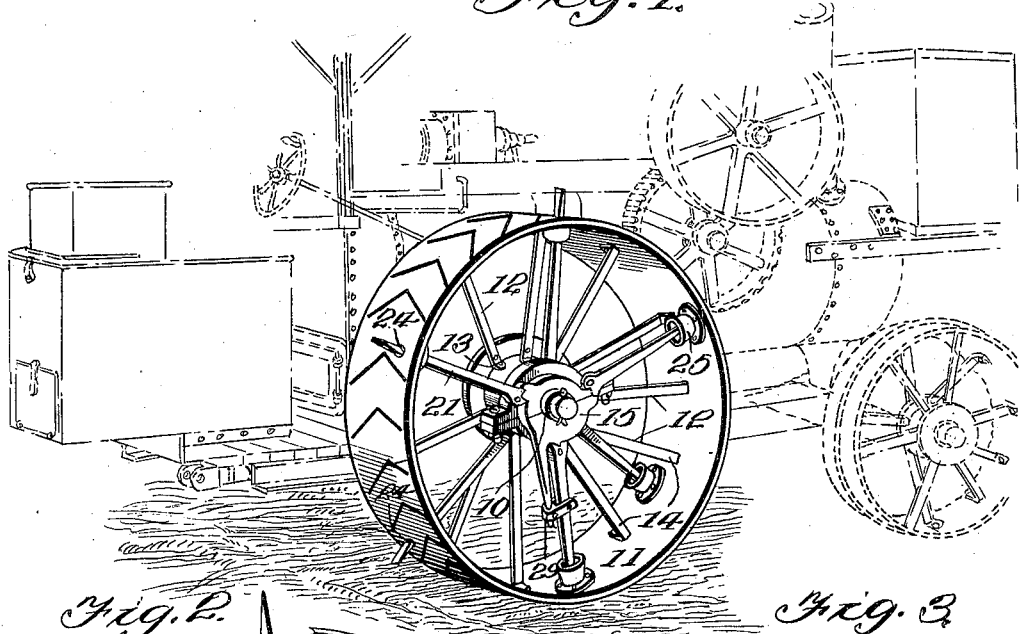
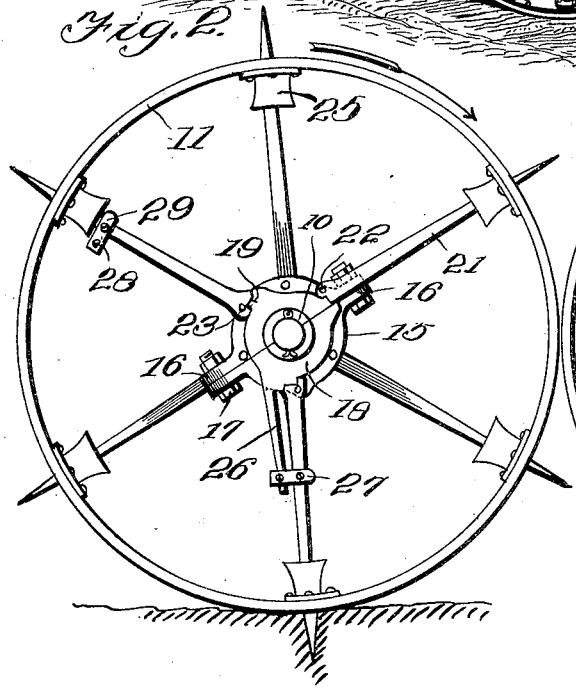
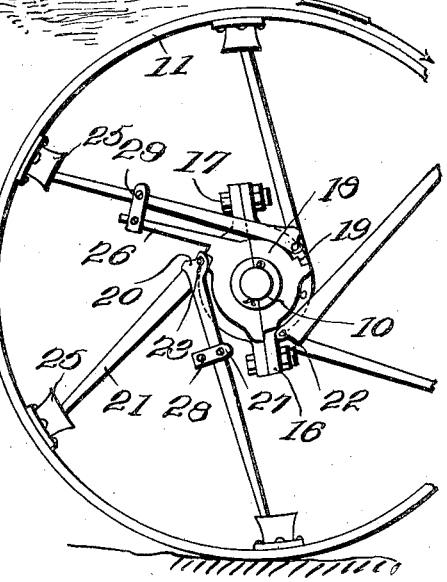
Inventor
John Blong.

UNITED STATES PATENT OFFICE.

JOHN BLONG, OF FORT ATKINSON, IOWA.

TRACTION-WHEEL.

1,057,405.  Specification of Letters Patent.  Patented Apr. 1, 1913.

Application filed May 28, 1912. Serial No. 700,260.

*To all whom it may concern:*

Be it known that I, JOHN BLONG, citizen of the United States, residing at Fort Atkinson, in the county of Winneshiek and State of Iowa, have invented certain new and useful Improvements in Traction-Wheels, of which the following is a specification.

My invention relates to new and useful improvements in traction wheels, and the object of my invention is to provide a traction wheel having a plurality of extensible spurs adapted to be swung to project by their outer ends through the rim of the wheel to prevent the slipping of the wheel in soft, muddy or sandy soil.

A further object of my invention is to provide a novel means of applying the spurs, said means being such that they may be applied to conventional forms of traction wheels now on the market.

A still further object of my invention is to provide a split collar adapted to be secured to the hub of the wheel, and a novel means of attaching the inner ends of the spurs to this collar in such a manner that the collar forms a seat for the ends when the spurs are in extended position. And a still further object of my invention is to provide a simple and effective means for locking the spurs against movement when either in extended or retracted position.

With these and other objects in view, my invention will be more fully described, illustrated in the accompanying drawing and then specifically pointed out in the claim which is attached to and forms a part of this application.

In the drawings: Figure 1 is a fragmentary perspective of a traction engine showing my traction wheel in use. Fig. 2 is an elevation of the traction wheel with the spurs extended, the spokes being omitted to better show the construction. Fig. 3 is a view similar to Fig. 2 showing the spurs retracted.

Corresponding and like parts are referred to in the following description and indicated in all the views of the accompanying drawing by the same reference characters.

Although it will be understood that my device may be adapted for use upon any ordinary form of traction wheel, I have, for the sake of clearness, illustrated its application upon a particular form of traction wheel. This traction wheel includes a hub 10 bored longitudinally for the seat of the spindle terminal of an axle, and a relatively wide rim or tread 11. A plurality of spokes 12 which are preferably formed of metal, are secured by their laterally directed inner ends 13 to the hub and by their laterally directed outer ends 14 to the tread 11.

My invention includes a split collar 15 comprising two sections provided with radially directed perforated ears 16 adapted to receive locking bolts 17, by means of which the sections are clamped about the hub and between the spoke engaging flanges thereof. The collar thus formed is provided upon its outer faces with bosses 18 having angular faces 19 providing seats for the angularly formed inner terminals 20 of the spurs 21. As shown, these seats are substantially L-shaped and are formed in extended portions of the bosses, while the inner terminals of the spurs are provided with arcuate extensions 22 perforated to receive pivot pins 23 which are passed through the perforations and into the collar to pivotally mount the spurs thereon in such a manner that in the retracted position of the spurs, the latter bear against the peripheral edge portions of the bosses, while in extended position they seat by their ends in the seats formed therein.

The rim of the wheel is provided at spaced intervals with suitable apertures 24 through which the outer ends of the spurs pass, and secured to the inner face of the rim and surrounding each of these apertures is a flared sleeve 25 which receives the outer end of the spur and holds the same against disengagement when in retracted position. As shown, these sleeves are mounted upon the rim with their flared ends directed inwardly, this flaring of the sleeves permitting the slight lateral movement of the spurs required in their extension and retraction by the turning of the collar about the hub. As a means for securing the spurs in their extended or retracted position, I have provided a lever arm 26 which is rigidly secured by one end to one of the bosses 18, and the free end of which projects toward the rim and in the same plane with adjacent spurs upon that side of the collar. This arm is employed in rotating the collar to extend or retract the spurs, and when the spurs are extended, the arm is in parallel spaced relation to one of the spurs, while when the spurs are retracted, it is correspondingly positioned with respect to the other of these adjacent spurs. Each of these adjacent spurs is provided with a sleeve 27 which is movable along the spur and provided with an apertured extension 28 adapted to receive the free end of the lever arm 26 when said arm is swung into parallel position thereto. Set screws 29 are provided for securing these sleeves in adjusted position upon their respective spurs. In operation, assuming the spurs to be in retracted position and locked by one of these sleeves 27, the set screw of said sleeve is loosened and the sleeve moved outwardly upon the spur to free the lever, when the set screw is again tightened to hold the sleeve against movement. The lever is then actuated to partially rotate the collar 15 about the hub and so extend the spurs through the rim, this action continuing until the arm extends in spaced relation to the next adjacent spur. The sleeve upon that spur is then moved inwardly to engage the lever arm and locked upon the spur, thus locking the spurs in extended position.

As will be readily seen, this device may be applied to all forms of traction wheels now in use, and when so applied may be quickly and simply operated to move the spurs as desired. It will further be apparent that by providing the lever arm and the movable sleeves, the device may be locked in either position. When the spurs are locked in their extended position, their inner ends bear in the seats formed in the bosses of the collar and practically all strain upon the pivot pins is relieved.

What I claim is:

A traction wheel including a hub, a rim, spokes connecting the hub and rim, a collar mounted about the hub and provided with a plurality of spaced bosses, each of said bosses being cut-away to provide an angular seat, and a plurality of spurs pivoted by their inner ends to said collar and with their free ends movable through the rim, the inner ends of said spurs beyond their pivotal point being cut-away to form angular terminals which in extended position of the spurs bear against the angular seats of the bosses to support the strain upon the spurs and thus relieve the pivotal connection of the spurs and collar from the greater part of the strain which they would otherwise support.

In testimony whereof I affix my signature in presence of two witnesses.

JOHN BLONG. [L. S.]

Witnesses:
J. B. WAGNER,
FRED HOUDEK.

Copies of this patent may be obtained for five cents each, by addressing the "Commissioner of Patents, Washington, D. C."